US012633625B2

(12) United States Patent
Zhou et al.

(10) Patent No.: US 12,633,625 B2
(45) Date of Patent: May 19, 2026

(54) CURRENT COLLECTOR, BATTERY CELL, BATTERY AND ELECTRICAL DEVICE

(71) Applicant: CONTEMPORARY AMPEREX TECHNOLOGY CO., LIMITED, Ningde (CN)

(72) Inventors: Yuhan Zhou, Ningde (CN); Meng Li, Ningde (CN); Zhen Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/299,369

(22) Filed: Aug. 14, 2025

(65) Prior Publication Data

US 2025/0372664 A1 Dec. 4, 2025

Related U.S. Application Data

(63) Continuation of application No. PCT/CN2023/140637, filed on Dec. 21, 2023.

(30) Foreign Application Priority Data

Jun. 5, 2023 (CN) .......................... 202321409682.2

(51) Int. Cl.
*H01M 4/74* (2006.01)
*H01M 4/75* (2006.01)
(Continued)

(52) U.S. Cl.
CPC ....... *H01M 50/531* (2021.01); *H01M 50/538* (2021.01); *H01M 50/645* (2021.01); *H01M 50/536* (2021.01); *H01M 2220/20* (2013.01)

(58) Field of Classification Search
CPC ............. H01M 50/531; H01M 50/538; H01M 50/645; H01M 2220/20
See application file for complete search history.

(56) References Cited

U.S. PATENT DOCUMENTS

2016/0133882 A1* 5/2016 Lee ................... H01M 10/0525
429/163
2017/0084894 A1* 3/2017 Freiman .............. H01M 50/367
(Continued)

FOREIGN PATENT DOCUMENTS

CN 210743993 U 6/2020
CN 216872214 U 7/2022
(Continued)

OTHER PUBLICATIONS

International Search Report and Written Opinion mailed on Mar. 15, 2024, received for PCT Application PCT/CN2023/140637, filed on Dec. 21, 2023, 13 pages including English Translation.

*Primary Examiner* — Lisa S Park
(74) *Attorney, Agent, or Firm* — XSENSUS LLP

(57) ABSTRACT

A current collector comprises a current collector body, provided with a first side and a second side which are oppositely arranged, an opening passing through the first side and the second side being formed in the current collector body; and a blocking structure, which is arranged at the opening and is used for preventing solid particles from passing through the opening from the first side to move to the second side. The blocking structure facilitates an electrolyte to enter, via the current collector, a space above or below the current collector inside a casing, thus ensuring that the electrolyte wets an end of an electrode assembly and increasing the internal space utilization of the casing, and additionally, the blocking structure can prevent metal particles generated during a welding process of the current collector from entering the electrode assembly.

26 Claims, 10 Drawing Sheets

(51) Int. Cl.
  *H01M 50/531*    (2021.01)
  *H01M 50/538*    (2021.01)
  *H01M 50/645*    (2021.01)
  *H01M 50/536*    (2021.01)

(56)                  References Cited

U.S. PATENT DOCUMENTS

| | | | |
|---|---|---|---|
| 2022/0099205 A1* | 3/2022 | Casey | H01M 50/3425 |
| 2022/0102824 A1* | 3/2022 | Lei | H01M 50/154 |
| 2023/0207989 A1* | 6/2023 | Yang | H01M 50/325 |
| | | | 429/54 |
| 2023/0299396 A1* | 9/2023 | Deng | H01M 50/184 |
| | | | 429/179 |
| 2024/0313364 A1* | 9/2024 | Lee | H01M 50/107 |

FOREIGN PATENT DOCUMENTS

| | | |
|---|---|---|
| CN | 219123438 U | 6/2023 |
| CN | 219658741 U | 9/2023 |
| JP | 2016-054023 A | 4/2016 |

* cited by examiner

CURRENT COLLECTOR, BATTERY CELL, BATTERY AND ELECTRICAL DEVICE

CROSS-REFERENCE TO RELATED APPLICATIONS

The present application is a continuation of International Patent Application No. PCT/CN2023/140637, filed on Dec. 21, 2023, which claims priority to Chinese Patent Application No. 202321409682.2, filed with China National Intellectual Property Administration on Jun. 5, 2023 and entitled "CURRENT COLLECTOR, BATTERY CELL, BATTERY, AND ELECTRIC DEVICE", the content of each are incorporated herein by reference in their entirety.

TECHNICAL FIELD

The present application relates to the technical field of battery production, and in particular, to a current collector, a battery cell, a battery, and an electric device.

BACKGROUND

In the production of lithium-ion batteries, the current collector, as a component member of the battery cell, is crucial to the overall performance and reliability of the battery product.

During the production of battery cells, one end of the current collector is welded to the electrode tab, and the other end is welded to the post terminal, so as to ensure the normal charging and discharging operations of the battery cell. However, in the related art, the current collector welding process has the problem of affecting the reliability of the battery cells.

SUMMARY

The present application aims to at least partially solve the technical problems existing in the prior art. To this end, one of the objectives of the present application is to provide a current collector that can improve the reliability of a battery cell, a battery cell, a battery, and an electric device.

According to a first aspect of the present application, provided is a current collector, including: a current collector body having a first side and a second side disposed opposite to each other, where an opening penetrating the first side and the second side is formed on the current collector body; and a blocking structure disposed at the opening and configured to prevent solid particles from passing through the opening from the first side to move to the second side. By means of the blocking structure, in one aspect, an electrolyte can conveniently pass through the current collector to enter a space above or below the current collector inside a housing, thereby ensuring that the electrolyte wets an end of an electrode assembly and improving the utilization rate of an internal space of the housing; in another aspect, the blocking structure can prevent metal particles produced during welding of the current collector from entering the electrode assembly.

In some embodiments, the blocking structure is configured as a mesh structure and blocks the opening. Optionally, the blocking structure includes a blocking plate, a plurality of first through holes in communication with the opening are formed on the blocking plate, and the plurality of first through holes are spaced apart from each other, such that the blocking plate is configured as a mesh structure; or the blocking structure includes a plurality of blocking strips that are arranged in a staggered manner, and the plurality of blocking strips form a plurality of first through holes in communication with the opening; the first through holes are configured to allow liquid to flow through and can prevent solid particles from passing through. By configuring the blocking structure as a mesh structure, the solid particles can be prevented from moving from positions at the end of the opening to the second side, which can ensure the blocking effect, such that the metal particles produced during the welding of the current collector are prevented from entering the electrode assembly, thereby effectively improving the reliability of the battery cell.

In some embodiments, apertures of the first through holes on a side of the blocking structure facing away from the second side are 100-500 μm. Optionally, the apertures of the first through holes on the side of the blocking structure facing away from the second side are 100-200 μm. By limiting the apertures to 500 μm or less, the metal particles produced during the welding can be prevented from passing through the first through holes. In addition, by setting the apertures of the first through holes to 100 μm or more, the electrolyte can be ensured to smoothly flow through without forming local blockages. In addition, by setting the apertures to 200 μm or less, the metal particles produced during the welding can be prevented from passing through the first through holes, thereby improving the reliability of the electrode assembly and the battery cells.

In some embodiments, cross-sectional areas of the first through holes gradually increase from the first side to the second side. With such a configuration, not only can the metal particles be prevented from passing through the first through holes, but also the smooth flow of the electrolyte can be ensured, thereby ensuring the wettability of the electrode assembly, such that the reliability of the electrode assembly and the battery cell can be ensured.

In some embodiments, the blocking structure is a tubular structure and is disposed around a circumference of the opening, and one end of the blocking structure is connected to the first side and the other end extends in a direction away from the second side. In some embodiments, the blocking structure includes a blocking ring, and the blocking ring is disposed around the circumference of the opening; and optionally, the blocking ring is continuous in the circumferential direction. In some other embodiments, the blocking structure includes a plurality of blocking columns, and the plurality of blocking columns are spaced apart from each other around the circumference of the opening; optionally, interspaces between adjacent blocking columns are configured to allow liquid to flow through and to prevent the solid particles from passing through. By configuring the blocking structure as a tubular structure, the solid particles can be prevented from moving from positions along the circumference of the opening to the second side, which can ensure the blocking effect, such that the metal particles produced during the welding of the current collector are prevented from entering the electrode assembly, thereby effectively improving the reliability of the battery cell.

In some embodiments, in this embodiment, second through holes in communication with the opening are formed on the blocking structure, the second through holes are configured to allow liquid to flow through, and the second through holes can prevent the solid particles from passing through. In one aspect, the wall part of the tubular structure itself has the function of blocking the entry of metal particles scattered during the welding. In another aspect, the second through holes can allow the electrolyte to flow through but not allow the metal particles to pass through, such that the reliability of the battery cell can be ensured.

In some embodiments, apertures of the second through holes on a side of the blocking structure facing away from the opening are 100-500 μm; optionally, the apertures of the second through holes on the side of the blocking structure facing away from the opening are 100-200 μm. By limiting the apertures to 500 μm or less, the metal particles produced during the welding can be prevented from passing through the second through holes. In addition, by setting the apertures of the second through holes to 100 μm or more, the electrolyte can be ensured to smoothly flow through without forming local blockages. In addition, by setting the apertures to 200 μm or less, the metal particles produced during the welding can be prevented from passing through the second through holes, thereby improving the reliability of the electrode assembly and the battery cells.

In some embodiments, cross-sectional areas of the second through holes gradually increase in a direction close to the opening. With such a configuration, not only can the metal particles be prevented from passing through the second through holes, but also the smooth flow of the electrolyte can be ensured, thereby ensuring the wettability of the electrode assembly, such that the reliability of the electrode assembly and the battery cell can be ensured.

In some embodiments, third through holes are formed at positions around a circumference of the blocking structure on the current collector body, the third through holes are configured to allow liquid to flow through, and the third through holes can prevent the solid particles from passing through. Optionally, the number of third through holes is a plurality, the plurality of third through holes are divided into a plurality of groups of hole-like structures, with each group of hole-like structures including a plurality of third through holes. The plurality of groups of hole-like structures are spaced apart from each other around the circumference of the blocking structure. In some embodiments, the plurality of third through holes in each group are arranged in a fan-shaped array, a circular array, or a square array. Optionally, each group of hole-like structures extends from a position of the blocking structure to an edge of the current collector body. By providing the plurality of groups of third through holes, the flow efficiency of the electrolyte is increased and sufficient electrical contact space is reserved on the current collector. In addition, when problems such as overheating occur inside the electrode assembly and pressure relief through valve venting is required, the third through holes can facilitate the passage of gas inside the electrode assembly through the third through holes and the pressure relief through the explosion-proof valve, thereby preventing the pressure from being concentrated at the current collector and failing to be transferred to the explosion-proof valve, avoiding delayed valve venting, and further reducing safety risks.

In some embodiments, apertures of the third through holes on a side of the blocking structure facing away from the second through holes are 100-500 μm; optionally, the apertures of the third through holes on the side of the blocking structure facing away from the second side are 100-200 μm. By limiting the apertures to 500 μm or less, the metal particles produced during the welding can be prevented from passing through the third through holes. In addition, by setting the apertures of the third through holes to 100 μm or more, the electrolyte can be ensured to smoothly flow through without forming local blockages. In addition, by setting the apertures to 200 μm or less, the metal particles produced during the welding can be prevented from passing through the third through holes, thereby improving the reliability of the electrode assembly and the battery cells.

In some embodiments, cross-sectional areas of the third through holes gradually increase from the first side to the second side in a direction close to the opening. With such a configuration, not only can the metal particles be prevented from passing through the third through holes, but also the smooth flow of the electrolyte can be ensured, thereby ensuring the wettability of the electrode assembly, such that the reliability of the electrode assembly and the battery cell can be ensured.

In some embodiments, a sum of the areas of the third through holes on the first side of the current collector body is 10%-30% of a surface area of the first side of the current collector body. Thus, not only sufficient welding space is reserved on the current collector body, but also the flow efficiency of the electrolyte can be ensured.

In some embodiments, the current collector further includes an extension member, and the extension member is disposed at a circumferential edge on the first side and protrudes in a direction away from the second side. Optionally, the extension member and the current collector body are of an integrated structure.

According to a second aspect of the present application, provided is a battery cell, including a housing, an electrode assembly, a positive electrode current collector, and a negative electrode current collector, where the housing is provided with a positive electrode connection terminal and a negative electrode connection terminal; the electrode assembly is disposed in the housing; a positive electrode output end of the electrode assembly is electrically connected to the positive electrode connection terminal through the positive electrode current collector; a negative electrode output end of the electrode assembly is electrically connected to the negative electrode connection terminal through the negative electrode current collector; at least one of the positive electrode current collector and the negative electrode current collector is the current collector described above. The battery cell includes the current collector described above. Therefore, the battery cell also has the advantage of high reliability.

In some embodiments, the housing includes a housing body and a cover plate; the housing body is provided with an accommodating space with one end provided with an opening; the cover plate lids the opening and closes the opening; the negative electrode connection terminal is disposed on the cover plate, and the positive electrode connection terminal is disposed at a position of the housing body opposite to the cover plate; the electrode assembly is disposed in the accommodating space, and the positive electrode output end and the negative electrode output end are located at both ends of the electrode assembly to be connected to the positive electrode connection terminal and the negative electrode connection terminal, respectively. With such a configuration, the assembly and maintenance of the battery cell can be facilitated.

In some embodiments, the positive electrode current collector includes: a current collector body having a first side and a second side disposed opposite to each other, where an opening penetrating the first side and the second side is formed on the current collector body; and a blocking structure disposed at the opening and configured to prevent solid particles from passing through the opening from the first side to move to the second side, where the blocking structure is configured as a mesh structure and blocks the opening. By providing the blocking structure on the positive electrode current collector, the metal particles produced during the welding of the current collector can be prevented from passing through the first through holes, thereby ensuring the smooth flow of the electrolyte, such that the reliability of the battery cell can be ensured.

In some embodiments, the negative electrode current collector includes: a current collector body having a first side and a second side disposed opposite to each other, where an opening penetrating the first side and the second side is formed on the current collector body; and a blocking structure disposed at the opening and configured to prevent solid particles from passing through the opening from the first side to move to the second side, where the blocking structure is a tubular structure and is disposed around a circumference of the opening, and one end of the blocking structure is connected to the first side and the other end extends in a direction away from the second side; a top of the tubular structure is in contact with the cover plate and supports the cover plate, thereby increasing the structural strength of the cover plate and reducing or alleviating the problem of collapse of the cover plate.

In some embodiments, the electrode assembly is provided with a liquid injection channel, and the opening is opposite to and in communication with the liquid injection channel. Optionally, a size of the opening is matched with a size of the liquid injection channel. By providing the liquid injection channel, the liquid injection operation of the battery cell is facilitated, which is conducive to improving the wetting efficiency of the electrolyte, thereby reducing the production time and cost. By setting the size of the liquid injection channel to be the same as that of the opening, the liquid injection through the current collector is facilitated, which can further increase the liquid injection efficiency, thereby improving the reliability and stability of the battery cell.

In some embodiments, the electrode assembly is formed by winding a positive electrode plate, a separator, and a negative electrode plate that are arranged in a stacked manner, and the liquid injection channel is a central channel formed by a starting winding section of the positive electrode plate, the separator, and the negative electrode plate. In this embodiment, the collecting body is configured to be circular, and the projection of the outer boundary of the blocking structure on the current collector body is a central circle concentric with the current collector body. This is the case that the battery cell is a cylindrical battery cell. Apparently, it is conceivable to those skilled in the art that the current collector body of the current collector may also be configured as other shapes to adapt to different types of battery cells, and the specific shape of the blocking structure is not limited to a circular shape.

In some embodiments, the positive electrode current collector or the negative electrode current collector includes an extension member, the extension member is disposed at a circumferential edge of the first side and protrudes in a direction away from the second side, and an outer diameter of the extension member is greater than an inner diameter of the housing of the battery cell. Optionally, the outer diameter of the extension member is 0.2-0.5 mm greater than the inner diameter of the housing of the battery cell. Thus, after the extension is connected to the housing, an interference fit is formed. In the case that the extension member is continuously distributed along the circumferential edge, a so-called "seamless connection" is achieved between the current collector and the housing, which not only benefits the sealing performance of the battery cell, but also prevents the problem of laser leakage during laser welding.

In some embodiments, the positive electrode connection terminal is disposed on the housing body, and the negative electrode connection terminal is disposed on the cover plate; the electrode assembly is disposed in the accommodating space, and the positive electrode output end and the negative electrode output end are located at both ends of the electrode assembly to be connected to the positive electrode connection terminal through the positive electrode current collector and to the negative electrode connection terminal through the negative electrode current collector, respectively; the negative electrode current collector includes the extension member, and the extension member is electrically connected to the housing body.

In some embodiments, a liquid injection hole is formed on the positive electrode connection terminal, the liquid injection hole is sealed with a rubber plug, and the liquid injection hole is opposite to and in communication with the opening; or a liquid injection hole is formed on the negative electrode connection terminal, the liquid injection hole is sealed with a rubber plug, and the liquid injection hole is opposite to and in communication with the opening. By forming a liquid injection hole on the positive electrode connection terminal or the negative electrode connection terminal, the liquid injection operation can be facilitated, thereby increasing the liquid injection efficiency.

In some embodiments, the outer diameter of the extension member is 0.2-0.5 mm greater than the inner diameter of the housing. With such a configuration, the wrapping of the extension member in an outer circumferential direction of the housing is facilitated, thereby achieving seal welding between the extension member and the housing.

According to a third aspect of the present application, provided is a battery, including at least one of the battery cells described above.

According to a fourth aspect of the present application, provided is an electric device, including the battery described above, where the battery is configured to provide electric energy for the electric device.

BRIEF DESCRIPTION OF THE DRAWINGS

In the drawings, unless otherwise specified, the same reference numerals indicate the same or similar components or elements. The drawings are not necessarily drawn to scale. It should be understood that the drawings depict only some embodiments of the present application and are therefore not to be considered as limiting the scope of the present application.

Figures 1, 2:
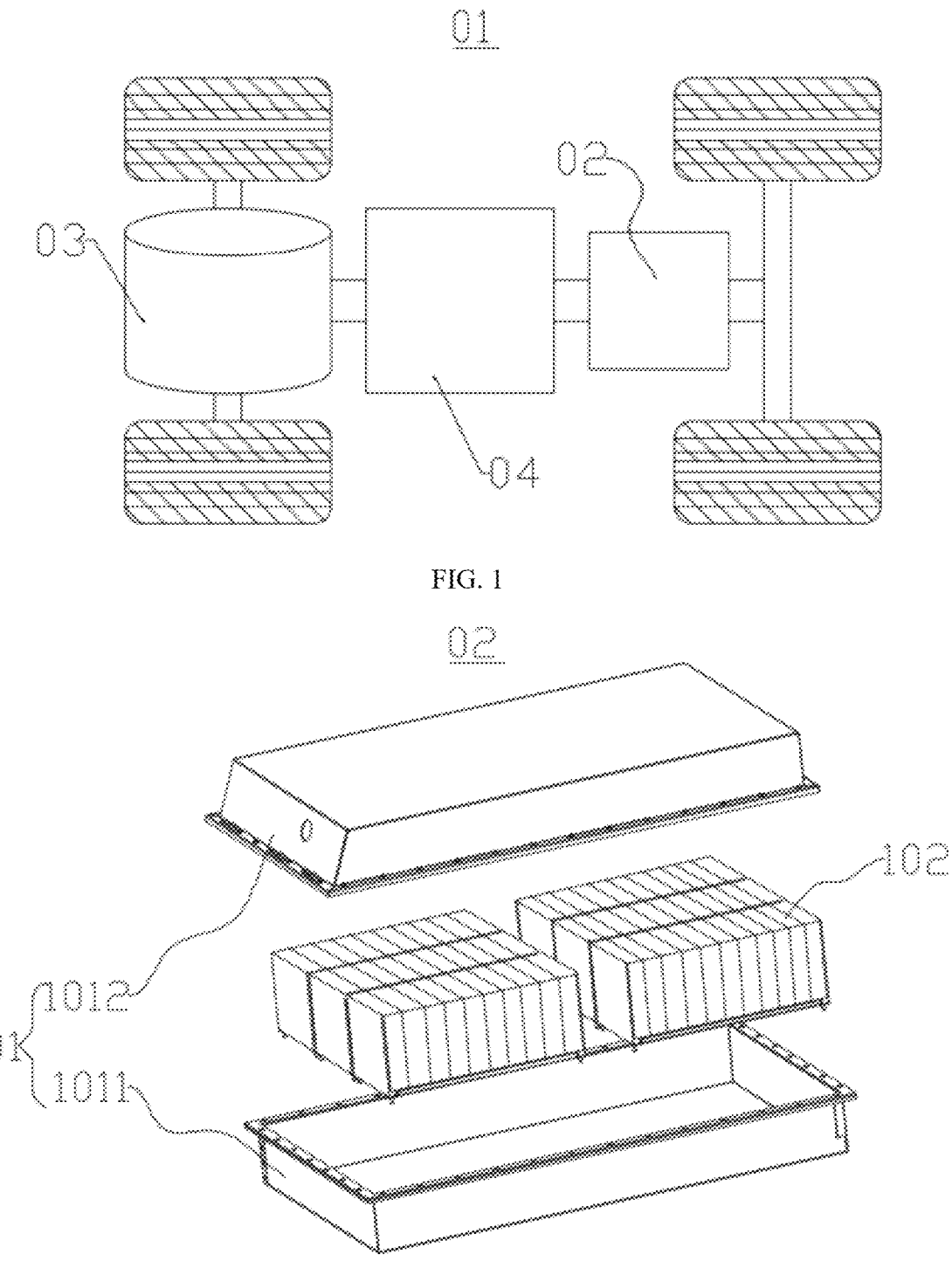
FIG. 1 is a schematic structural view of a vehicle provided according to some embodiments of the present application.
FIG. 2 is an exploded view of a battery according to some embodiments of the present application.

Description of the reference numerals:

01, vehicle; 02, battery; 03, motor; 04, controller; 101, case; 1011, first portion; 1012, second portion; 102, battery cell; 110, positive electrode side; 112, first side; 113, second side; 120, negative electrode side;

10, negative electrode current collector; 11, current collector body; 12, extension member; 13, third through hole; 14, first through hole; 15, opening; 16, tubular structure; 17, second through hole; 18, blocking structure;

20, housing; 21, housing body;

30, electrode assembly; 31, liquid injection channel; 40, cover plate;

50, post terminal; 55, liquid injection port;

60, sealing nail; 70, rubber plug; 80, sealing gasket; and 90, positive electrode current collector.

DETAILED DESCRIPTION

Embodiments of the technical solutions of the present application will be described in detail below with reference to the drawings. The following embodiments are only used to more clearly illustrate the technical solutions of the present application, and therefore, are only exemplary and do not limit the claimed scope of the present application.

Unless otherwise defined, all technical and scientific terms used herein have the same meaning as commonly understood by those skilled in the technical field to which the present application pertains. The terms used herein are only for the purpose of describing specific embodiments and are not intended to limit the present application. The terms "include", "comprise", and "provided with", and any variations thereof in the description and claims of the present application and the above drawing description are intended to encompass non-exclusive inclusions.

In the description of the embodiments of the present application, technical terms such as "first", "second", and the like are only used to distinguish different objects and should not be interpreted as indicating or implying the relative importance or implicitly indicating the number, particular order, or primary and secondary relationship of the indicated technical features. In the description of the embodiments of the present application, unless otherwise specifically defined, "plurality of" means two or more.

Reference in the present application to "embodiment" means that particular features, structures, or characteristics described in combination with the embodiments can be included in at least one embodiment of the present application. The references of the word in the context of the specification do not necessarily refer to the same embodiment, nor to independent or alternative embodiments exclusive of other embodiments. It will be explicitly and implicitly understood by those skilled in the art that the embodiments described herein can be combined with other embodiments.

In the description of the embodiments of the present application, the term "and/or" is merely a way to describe the associative relationship between associated objects, indi-cating that there are three possible relationships. For example, "A and/or B" may indicate that: only A is present, both A and B are present, and only B is present. In addition, the character "/" herein generally indicates an "or" relationship between the associated objects before and after the "/".

In the description of the embodiments of the present application, the term "plurality of" refers to two or more (including two). Similarly, "plurality of groups" refers to two or more (including two) groups, and "plurality of pieces" refers to two or more (including two) pieces.

In the description of the embodiments of the present application, the technical terms "center", "longitudinal", "transverse", "length", "width", "thickness", "upper", "lower", "front", "rear", "left", "right", "vertical", "horizontal", "top", "bottom", "inner", "outer", "clockwise" "counterclockwise", "axial", "radial", "circumferential" and the like indicate orientations or positional relationships based on those shown in the drawings. They are merely for the convenience of describing the present application and simplifying the description, rather than indicating or implying that the apparatus or element referred to must have a particular orientation or be constructed and operated in the specific orientation, and thus should not be construed as a limitation to the present application.

In the description of the embodiments of the present application, unless otherwise clearly specified and defined, the technical terms "mount", "interconnect", "connect", "fix", and the like should be interpreted in their broad senses. For example, they may be a fixed connection, a detachable connection, or an integral connection; a mechanical connection or an electrical connection; or a direct connection, an indirect connection via an intermediate, a communication between interiors of two elements, or an interaction between two elements. For those of ordinary skill in the art, the specific meanings of the above terms in the embodiments of the present application can be interpreted according to specific conditions.

In the present application, battery cells may include lithium-ion secondary batteries, lithium-ion primary batteries, lithium-sulfur batteries, sodium-lithium-ion batteries, sodium-ion batteries, magnesium-ion batteries, or the like. This is not limited in the embodiments of the present application. The battery cell may be cylindrical, flat, rectangular parallelepiped-shaped, or in other shapes. This is also not limited in the embodiments of the present application. According to the way of encapsulation, battery cells are typically divided into three types: cylindrical battery cells, prismatic battery cells, and pouch battery cells. This is also not limited in the embodiments of the present application.

The battery mentioned in the embodiments of the present application refers to a single physical module including one or a plurality of battery cells to provide higher voltage and capacity. For example, the battery mentioned in the present application may include a battery module, a battery pack, or the like. The battery generally includes a case used to encapsulate one or a plurality of battery cells. The case can prevent liquid or other foreign matters from affecting the charging or discharging of the battery cells.

A battery cell includes an electrode assembly and an electrolyte. The electrode assembly is composed of a positive electrode plate, a negative electrode plate, and a separator. A battery cell primarily works by the movement (e.g., deintercalation) of metal ions between the positive electrode plate and the negative electrode plate. The positive electrode plate includes a positive electrode current collector and a positive electrode active substance layer. The surface of the positive electrode current collector is coated with the positive electrode active substance layer. The positive electrode current collector not coated with the positive electrode active substance layer protrudes from the positive electrode current collector coated with the positive electrode active substance layer. The positive electrode current collector not coated with the positive electrode active substance layer serves as a positive electrode tab. Taking lithium-ion batteries as an example, the material of the positive electrode current collector may be aluminum, and the positive electrode active substance may be lithium cobaltate, lithium iron phosphate, ternary lithium, lithium manganate, or the like. The negative electrode plate includes a negative electrode current collector and a negative electrode active substance layer. The surface of the negative electrode current collector is coated with the negative electrode active substance layer. The negative electrode current collector not coated with the negative electrode active substance layer protrudes from the negative electrode current collector coated with the negative electrode active substance layer. The negative electrode current collector not coated with the negative electrode active substance layer serves as a negative electrode tab. The material of the negative electrode current collector may be copper, and the negative electrode active substance may be carbon, silicon, or the like. To ensure the passing of a large current without fusing, a plurality of positive electrode tabs are provided and stacked together, and a plurality of negative electrode tabs are provided and stacked together. The material of the separator may be polypropylene (PP), polyethylene (PE), or the like. In addition, the electrode assembly may be a winding structure or a stacking structure, but the embodiments of the present application are not limited thereto.

In the prior art, with the development of clean energy, more and more devices are powered by electric energy, which in turn drives the rapid development of power batteries (such as lithium-ion batteries) that can store large amounts of electrical energy and undergo multiple charge-discharge cycles.

The inventors have noticed that during the production of battery cells, one end of the current collector is welded to the electrode tab and the other end is welded to the post terminal, so as to ensure the normal charging and discharging operations of the battery cell. There is a certain probability that metal particles produced during the welding will enter the electrode assembly, and the metal particles entering the electrode assembly may cause a short circuit, thereby affecting the production of the battery cell and increasing the safety hazard of the electrode assembly.

In order to solve the above problems, the inventors have designed a particle-resistant internally welded current collector. A current collector body of the current collector has a first side and a second side disposed opposite to each other, and an opening penetrating the first side and the second side is formed on the current collector body. The current collector is provided with a blocking structure at the opening, which is configured to prevent solid particles from passing through the opening from the first side to move to the second side. By means of the blocking structure, in one aspect, the electrolyte can conveniently pass through the current collector to enter a space above or below the current collector inside the housing, thereby ensuring that the electrolyte wets an end of the electrode assembly and improving the utilization rate of an internal space of the housing; in another aspect, the blocking structure can prevent metal particles produced during the welding of the current collector to the electrode tab and/or the housing from entering the electrode assembly.

The technical solutions described in the embodiments of the present application are suitable for batteries and electric devices using batteries.

The electric device may be a vehicle, a mobile phone, a portable device, a laptop computer, a ship, a spacecraft, an electric toy, an electric tool, or the like. The vehicle may be a petrol or diesel vehicle, a natural gas vehicle, or a new energy vehicle, and the new energy vehicle may be a pure electric vehicle, a hybrid electric vehicle, an extended-range vehicle, or the like; the spacecraft includes an airplane, a rocket, a space shuttle, a spaceship, and the like; the electric toy includes a stationary or mobile electric toy, such as a game console, an electric car toy, an electric ship toy, and an electric airplane toy; the electric tool includes an electric metal cutting tool, an electric grinding tool, an electric assembling tool, and an electric tool for railways, such as an electric drill, an electric grinder, an electric wrench, an electric screwdriver, an electric hammer, an electric impact drill, a concrete vibrator, and an electric planer. The electric devices described above are not specially limited in the embodiments of the present application.

For ease of explanation in the following embodiments, the structure of the battery cell will be described by taking the case where the electric device is a vehicle as an example.

FIG. 1 is a structural schematic view of a vehicle 01 according to some embodiments of the present application. Referring to FIG. 1, a battery 02 is disposed inside the vehicle 01. The battery 02 may be disposed at the bottom, head, or tail of the vehicle 01, or may even be mounted on the top or side of the vehicle 01. The battery 02 may be configured to power the vehicle 01. For example, the battery 02 may serve as an operation power source of the vehicle 01.

The vehicle 01 may further include a controller 04 and a motor 03. The controller 04 is used for controlling the battery 02 to power the motor 03, e.g., for operation power needed by the vehicle 01 for start-up, navigation, and driving. Certainly, in some embodiments of the present application, the battery 02 may not only serve as an operation power source for the vehicle 01, but also as a driving power source for the vehicle 01 to, instead of or in part instead of fuel or natural gas, provide driving power for the vehicle 01.

FIG. 2 is an exploded view of a battery 02 according to some embodiments of the present application. The battery 02 includes a case 101 and battery cells 102. The case 101 is configured to accommodate the battery cells 102.

The case 101 is a component for accommodating the battery cells 102, and the case 101 provides an accommodating space for the battery cells 102 to ensure the reliability, stability, and safety of the battery cells 102. The case 101 may be of a variety of structures. In some embodiments, the case 101 may include a first portion 1011 and a second portion 1012. The first portion 1011 and the second portion 1012 are mutually lidded onto each other, snap-fitted, or stably fitted in other ways to define an accommodating space for accommodating the battery cells 102. In addition, the first portion 1011 and the second portion 1012 may be in a plurality of shapes, such as a cylindrical shape and a rectangular parallelepiped shape. The first portion 1011 may be a hollow structure with one side open, the second portion 1012 may also be a hollow structure with one side open, and the open side of the first portion 1011 is lidded with the open side of the second portion 1012 to form a case 101 having an accommodating space. Alternatively, the first portion 1011 may be a hollow structure with one side open, the second portion 1012 may be of a plate-like structure, and the open side of the first portion 1011 is lidded with the second portion 1012 to form a case 101 having an accommodating space. The first portion 1011 and the second portion 1012 may be sealed by using a sealing element. The sealing element may be a seal ring, a sealant, or the like.

Referring to FIG. 2 again, in the battery 02, the number of battery cells 102 may be one or a plurality. If a plurality of battery cells 102 are provided, the plurality of battery cells 102 may be connected in series, in parallel, or in series-parallel. The series-parallel connection means that both series connection and parallel connection are present in the connection of the plurality of battery cells 102. Alternatively, the plurality of battery cells 102 may be first connected in series, in parallel, or in series-parallel to form battery modules, and then the plurality of battery modules are connected in series, in parallel, or in series-parallel to form a whole to be accommodated in the case 101. Alternatively, all the battery cells 102 may be directly connected in series, in parallel, or in series-parallel, and then the whole formed by all the battery cells 102 is accommodated in the case 101.

In some embodiments, the battery 02 may further include a busbar component. The plurality of battery cells 102 may be electrically connected to each other through the busbar component to achieve series connection, parallel connection, or series-parallel connection among the plurality of battery cells 102. The busbar component may be a metal conductor, such as copper, iron, aluminum, stainless steel, or an aluminum alloy.

Figure 3:
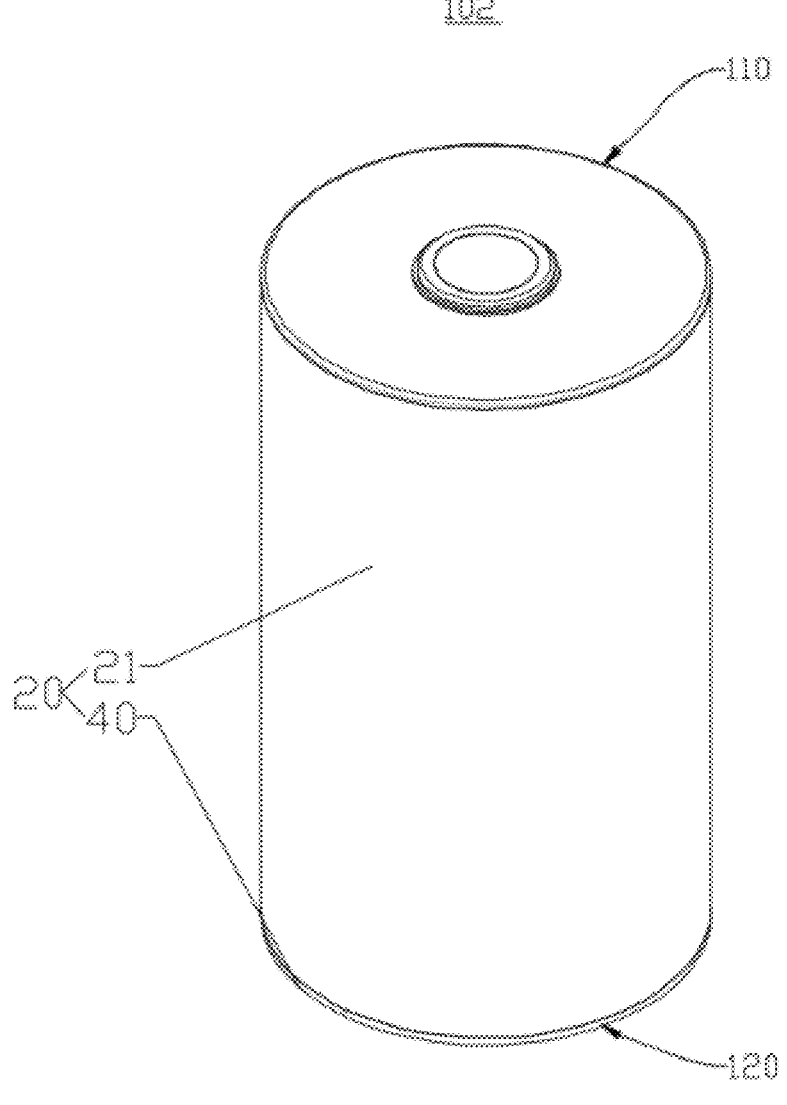
FIG. 3 is a structural schematic view of a battery cell according to some embodiments of the present application.
Figure 4:
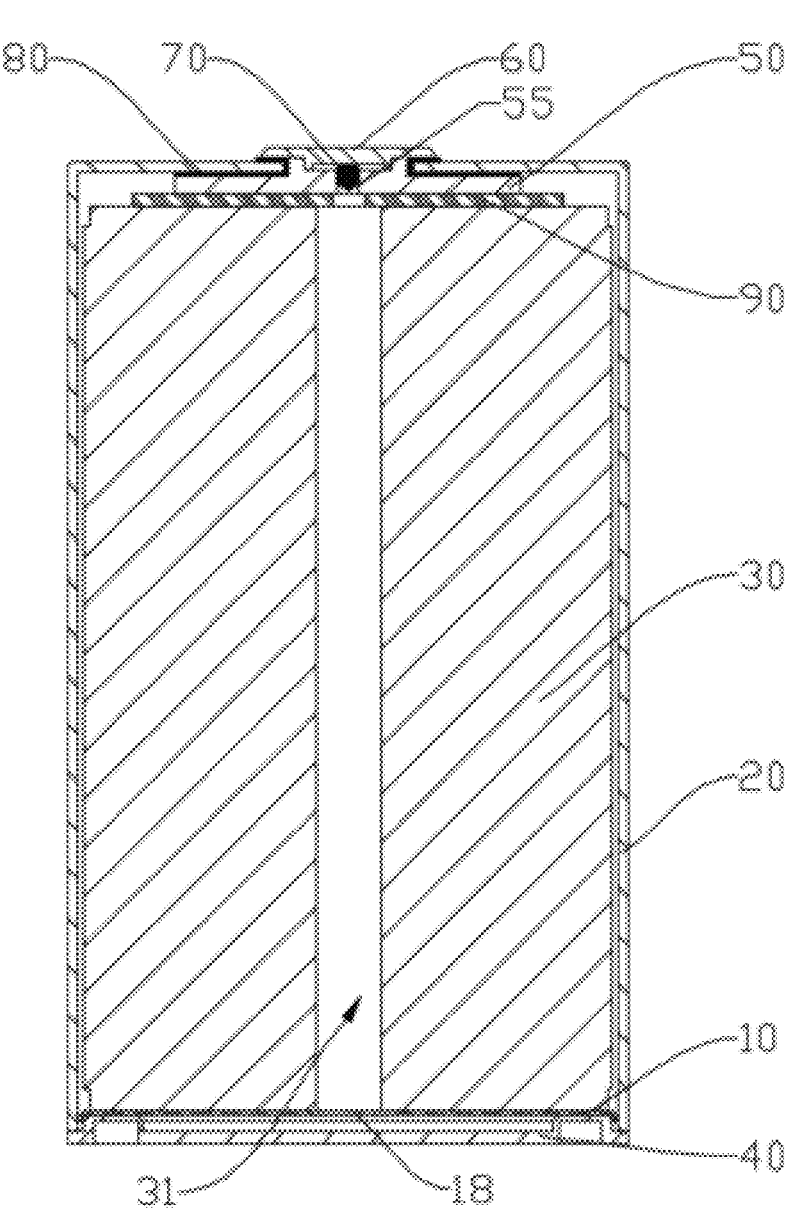
FIG. 4 is a cross-sectional view of a battery cell according to some embodiments of the present application.
Figure 5:
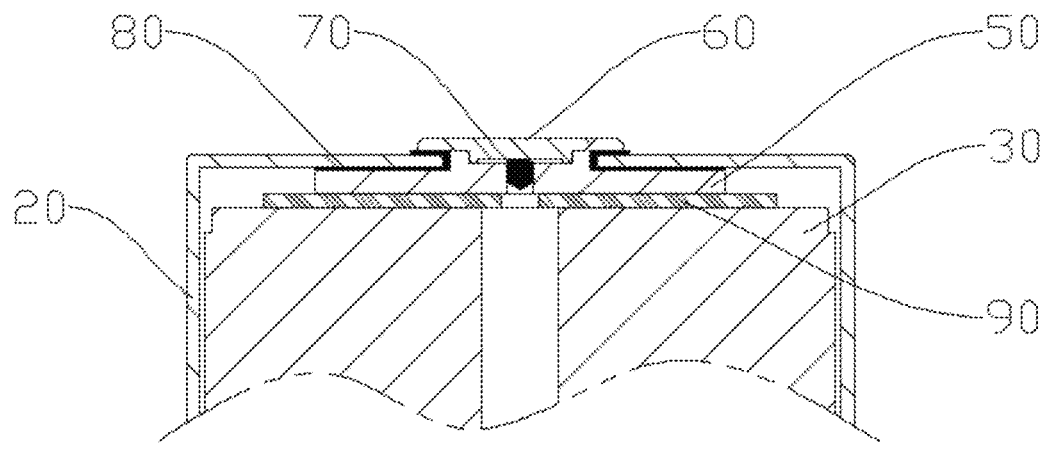
FIG. 5 is a partial enlarged view in a positive electrode direction in FIG. 4.
Figure 6:
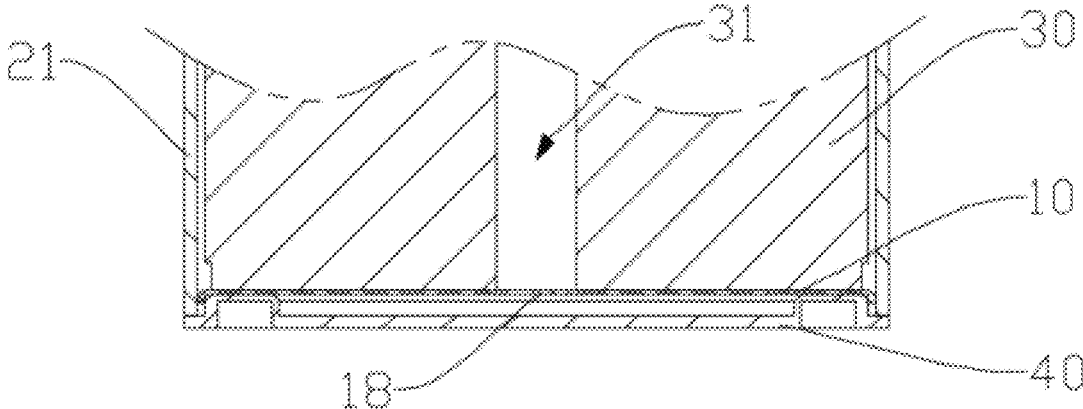
FIG. 6 is a partial enlarged view in a negative electrode direction in FIG. 4.

FIG. 3 is a schematic structural view of a battery cell 102 according to some embodiments of the present application. FIG. 4 is a cross-sectional view of a battery cell 102 according to some embodiments of the present application. FIG. 5 is a partial enlarged view in a positive electrode direction in FIG. 4. FIG. 6 is a partial enlarged view in a negative electrode direction in FIG. 4.

According to some embodiments of the present application, referring to FIG. 3 to FIG. 6, the battery cell 102 includes: a housing 20; an electrode assembly 30, a negative electrode current collector 10 and a positive electrode current collector 90, a cover plate 40, a positive electrode connection terminal (a post terminal 50), and a negative electrode connection terminal, which are disposed in the housing 20; and an electrolyte filled in the housing 20. A positive electrode output end of the electrode assembly 30 is electrically connected to the positive electrode connection terminal through the positive electrode current collector 90, and a negative electrode output end of the electrode assembly 30 is electrically connected to the negative electrode connection terminal through the negative electrode current collector 10.

FIG. 5 and FIG. 6 show partial views of a positive electrode side 110 and a negative electrode side 120 of the battery cell 102, respectively. The post terminal 50 is located on the positive electrode side 110 of the battery cell 102. The positive electrode current collector 90 is located in the housing 20 on the positive electrode side 110 and is connected to the positive electrode output end, i.e., a positive electrode tab (not shown in the figures), of the electrode assembly 30. The negative electrode current collector 10 is located in the housing 20 on the negative electrode side 120 and is connected to the negative electrode output end, i.e., a negative electrode tab (not shown in the figures), of the electrode assembly 30. A sealing gasket 80 is disposed between the post terminal 50 and the housing 20.

According to some embodiments of the present application, the housing 20 may include a housing body 21 and a cover plate 40. An accommodating space is defined in the housing body 21, one end of the accommodating space is provided with an opening, and the cover plate 40 lids the opening and closes the opening. As shown in FIG. 4, the cover plate 40 is disposed on the negative electrode side 120 of the battery cell 102, and the cover plate 40 can close the negative electrode of battery cell 102 while playing a conductive role similar to that of the post terminal 50, that is, the cover plate can serve as the negative electrode connection terminal of the battery cell 102. It should be understood that in other embodiments, the cover plate 40 does not necessarily serve as the negative electrode connection terminal, and similarly, the cover plate 40 may also be disposed on the positive electrode side 110 instead of the negative electrode side 120.

In some embodiments, the assembly steps of the battery cell 102 are generally as follows: before assembly, the positive electrode current collector 90 and the positive electrode tab of the electrode assembly 30 are fixedly connected as a whole outside the housing 20; the post terminal 50, the sealing gasket 80, and the whole of the positive electrode current collector 90 and the electrode assembly 30 are mounted in the housing 20 in sequence; then the negative electrode current collector 10 is fixedly connected to the negative electrode tab of the electrode assembly 30 and the inner side of the housing 20, respectively; finally, the cover plate 40 is mounted.

The fixed connection between the negative electrode current collector 10 and the negative electrode tab of the electrode assembly 30 and the inner side of the housing 20 is generally achieved by welding. The welding may be, but is not limited to, laser welding or resistance welding.

Figure 12:
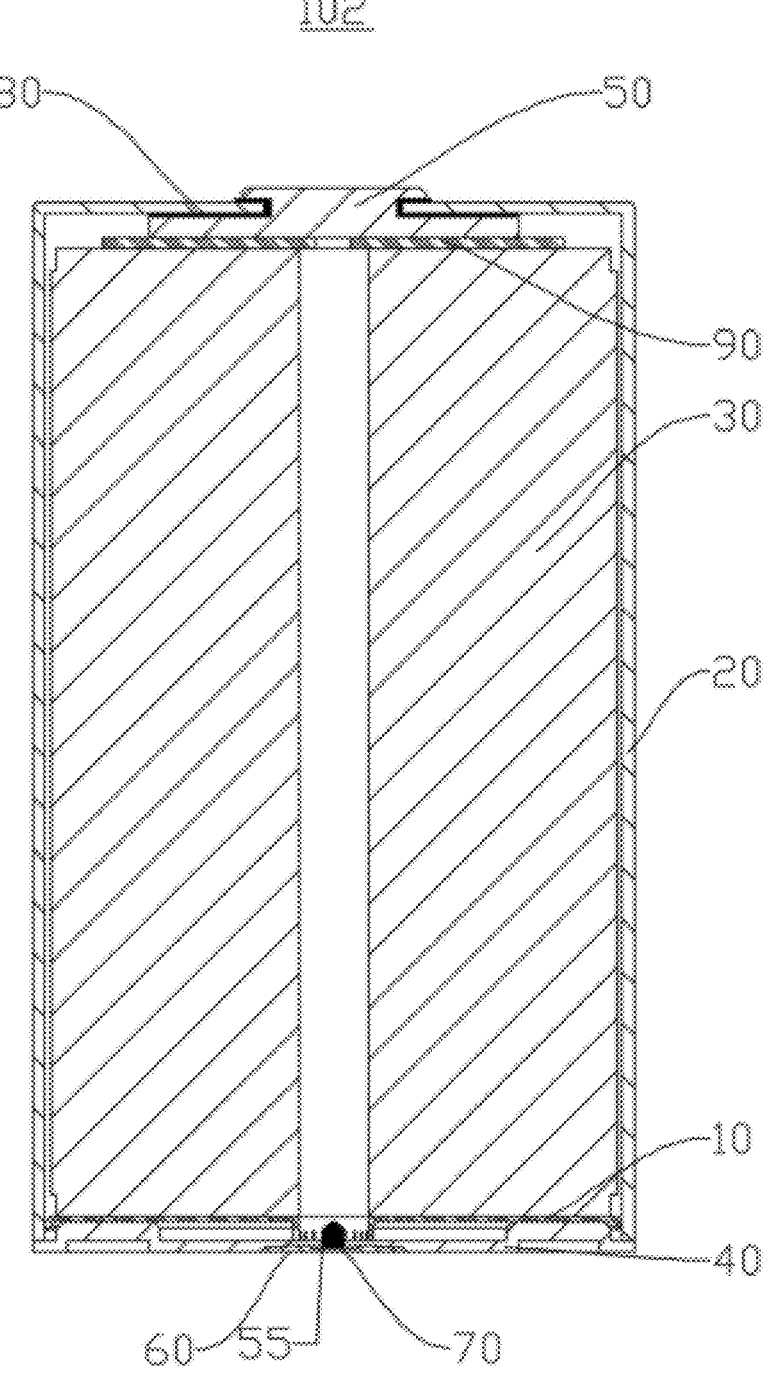
FIG. 12 is a cross-sectional view of a battery cell according to some embodiments of the present application.
Figure 13:
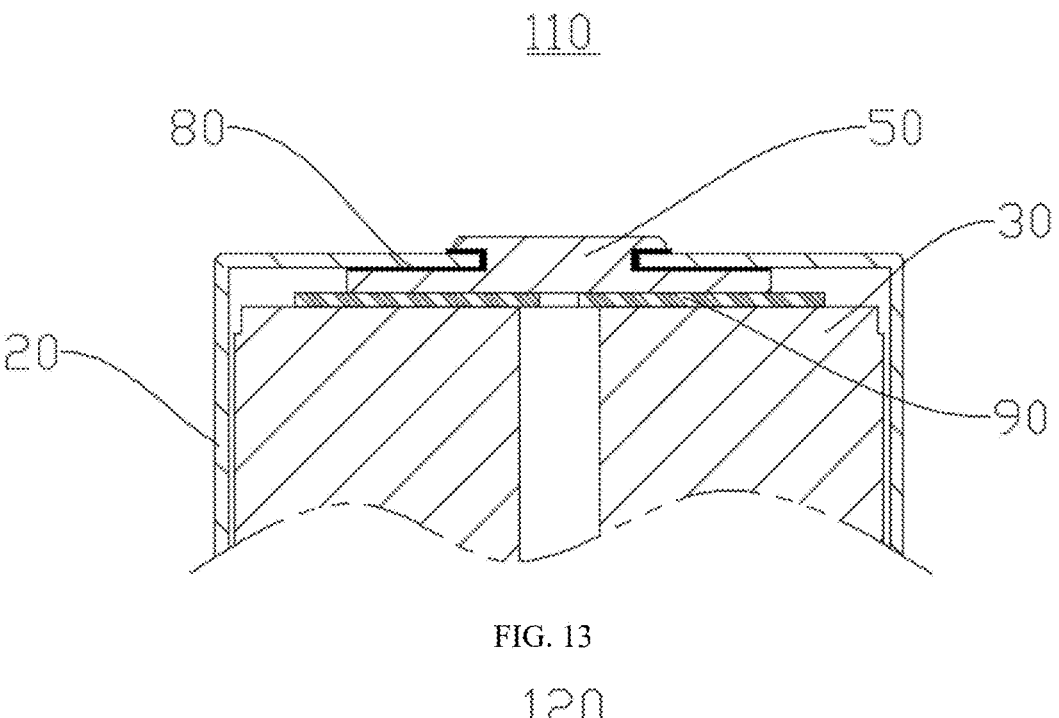
FIG. 13 is a partial enlarged view in a positive electrode direction of FIG. 12.
Figure 14:
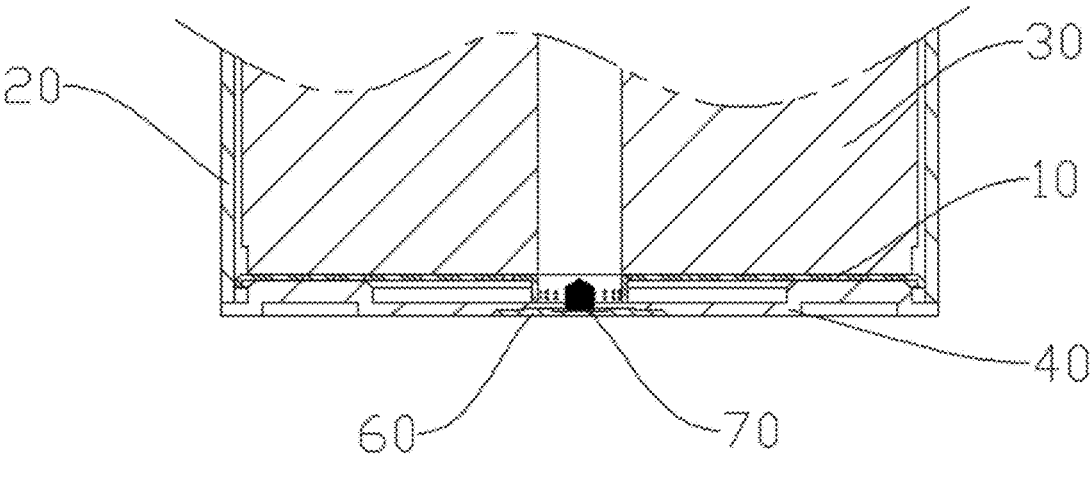
FIG. 14 is a partial enlarged view in a negative electrode direction of FIG. 12.

According to some embodiments of the present application, referring to FIG. 4 to FIG. 6, a positive electrode liquid injection mode is adopted for the battery cell 102. In this case, the post terminal 50 located on the positive electrode side 110 is provided with a liquid injection port 55, and the electrolyte enters the electrode assembly 30 from the liquid injection port 55. After the liquid injection is completed, the liquid injection port 55 is sealed by a rubber plug 70 and a sealing nail 60 in sequence. According to some embodiments of the present application, referring to FIG. 12 to FIG. 13, a negative electrode liquid injection mode is adopted for the battery cell 102. In this case, the cover plate 40 located on the negative electrode side 120 is provided with a liquid injection port 55, and the electrolyte enters the electrode assembly 30 from the liquid injection port 55. After the liquid injection is completed, the liquid injection port 55 is sealed by a rubber plug 70 and a sealing nail 60 in sequence.

In the examples of the present application, the structures of the positive electrode current collector 90 and the negative electrode current collector 10 may be the same or different. That is, the structures of the two are both the structures shown in FIG. 7 to FIG. 11, or the structure of either of the two may be the structure shown in FIG. 7 to FIG. 11. In the following, the structure and design of the current collector of the present application will be described in detail by taking the case where the negative electrode current collector 10 is the current collector of the structure shown in FIG. 7 to FIG. 11 and the positive electrode current collector 90 is of a conventional current collector structure as an example.

Figure 7:
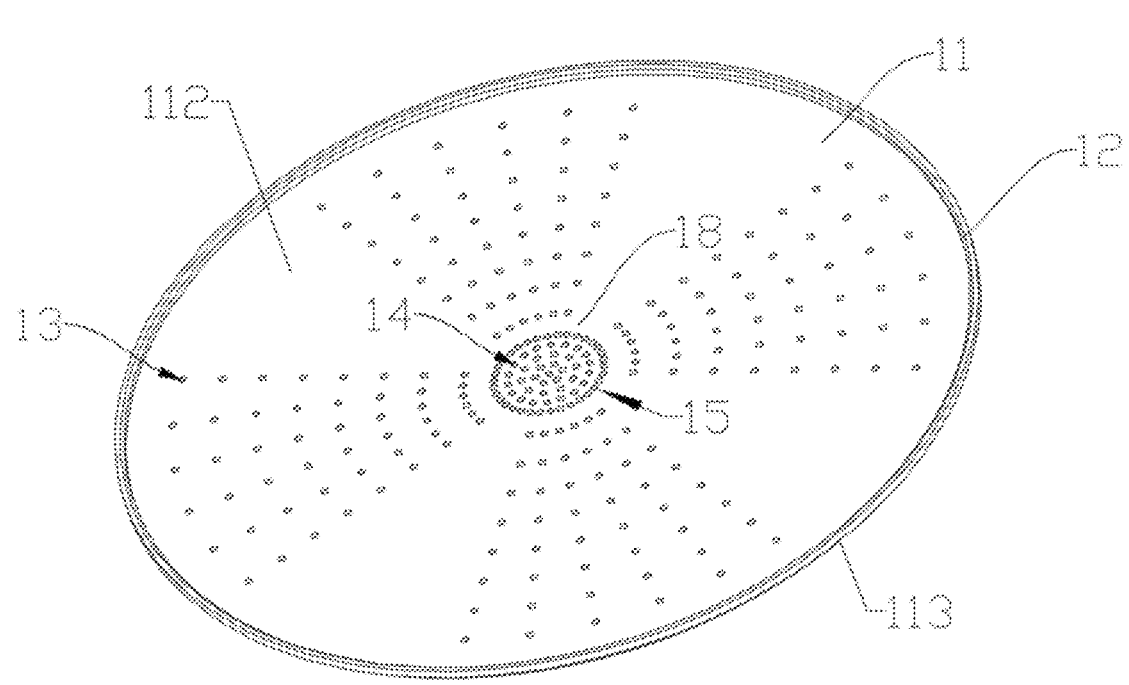
FIG. 7 is a perspective view of a current collector according to some embodiments of the present application.
Figure 8:
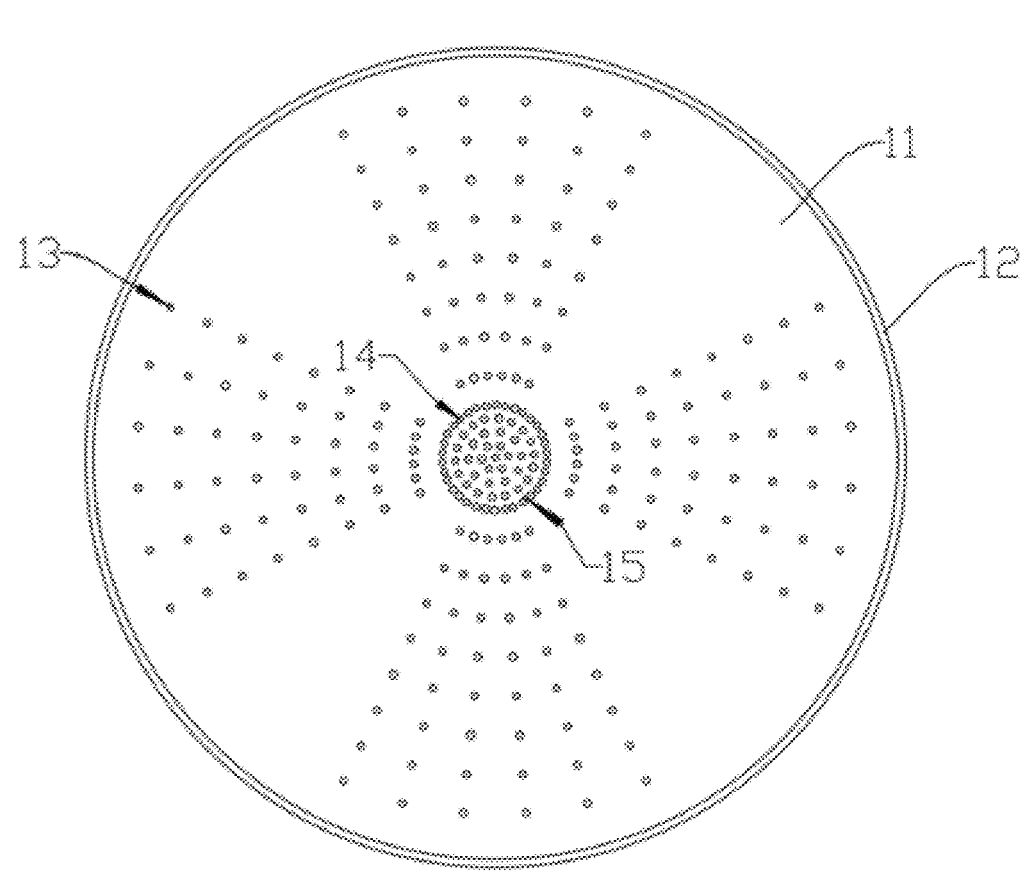
FIG. 8 is a top view of FIG. 7.
Figure 9:
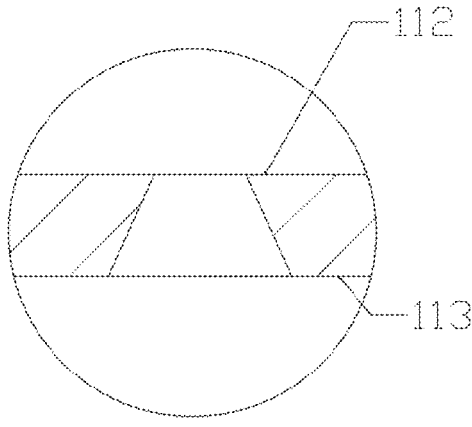
FIG. 9 is a partially enlarged cross-sectional view of a first through hole/a second through hole/a third through hole according to some embodiments of the present application.

FIG. 7 is a perspective view of a current collector according to a first embodiment of the present application. FIG. 8 is a top view of FIG. 7. FIG. 9 is a partially enlarged cross-sectional view of a first through hole/a second through hole/a third through hole according to some embodiments of the present application.

As shown in FIG. 7, the current collector (i.e., negative electrode current collector 10) according to the present application includes a current collector body 11 having a first side 112 and a second side 113 disposed opposite to each other. An opening 15 penetrating the first side 112 and the second side 113 is formed on the current collector body 11. In FIG. 7, the side of the current collector body 11 facing the observer is the first side 112, and the back side of the current collector body is the second side 113. Specifically, the first side 112 is the side of the current collector body 11 distal to the electrode assembly 30, and the second side 113 is the side of the current collector body 11 proximal to the electrode assembly 30.

In some technical solutions in the prior art, the current collector body is provided with a central opening or the current collector body is provided with a hollow-through groove near the central opening. As described above, such a configuration may cause problems such as a short circuit due to the fact that metal particles produced during the welding of the current collector enter the electrode assembly via the central opening or the hollow-through groove. In order to solve the problem, the current collector further includes a blocking structure 18 disposed at the opening 15 and configured to prevent solid particles from passing through the opening 15 from the first side 112 to move to the second side 113. The blocking structure 18 enables the electrolyte to flow through and flow in the housing 20, such that the electrolyte can wet an end of the electrode assembly 30 and the side of the current collector body 11 facing away from the electrode assembly 30, thereby improving the utilization rate of the internal space of the housing 20.

In some embodiments according to the present application, referring to FIG. 7 to FIG. 10 again, the blocking structure 18 is configured as a mesh structure and blocks the opening 15. Such a mesh blocking structure 18 can prevent the solid particles from passing through the opening 15 from the first side 112 to move to the second side 113. Optionally, as in the embodiment shown in FIG. 7, the blocking structure 18 includes a blocking plate. A plurality of first through holes 14 in communication with the opening 15 are formed on the blocking plate, and the plurality of first through holes 14 are spaced apart from each other, such that a mesh structure including the plurality of first through holes 14 is formed on the blocking plate. In some other embodiments not shown in the figures, the blocking structure 18 includes a plurality of blocking strips that are arranged in a staggered manner, and a plurality of first through holes 14 in communication with the opening 15 are formed between the plurality of staggered blocking strips. The apertures of the plurality of first through holes 14 on the side facing outwards, i.e., the side distal to the electrode assembly 30, are designed such that metal particles cannot pass through. Thus, such a configuration can not only ensure that the electrolyte passes through the current collector without hindrance, but also prevent metal particles during the welding from entering the electrode assembly 30. In this embodiment, the first through holes 14 are circular holes. However, it can be understood by those skilled in the art that the first through holes 14 may be openings of various shapes, such as circular, square, or slit-shaped openings, which will not be exhaustively listed here.

It should be noted that, in this embodiment, the first through holes 14 may be uniformly distributed or non-uniformly distributed, and the apertures of the first through holes may be set to be the same or different. It is important that the apertures of all the first through holes 14 on the outer side, i.e., the side distal to the electrode assembly 30, must be small enough so that the metal particles produced during the welding cannot pass through, thereby effectively preventing the particles produced during the welding from entering the electrode assembly 30 while ensuring the flow of the electrolyte.

Illustratively, in some embodiments, the apertures of the first through holes 14 on the side of the blocking structure 18 facing away from the second side 113 are 100-500 μm, optionally 100-200 μm. By limiting the apertures to 500 μm or less, the metal particles produced during the welding can be prevented from passing through the first through holes 14. In addition, by setting the apertures of the first through holes 14 to 100 μm or more, the electrolyte can be ensured to smoothly flow through without forming local blockages. In addition, by setting the apertures to 200 μm or less, the metal particles produced during the welding can be prevented from passing through the first through holes 14, thereby improving the reliability of the electrode assembly 30 and the battery cells 102. The size of this "aperture" can be measured using a conventional measuring tool, e.g., a vernier caliper.

According to some embodiments of the present application, referring to FIG. 9, the apertures of the first through holes 14 are of a structure that is narrower at the top and wider at the bottom, that is, the cross-sectional areas or inner diameters of the apertures gradually increase from the side facing away from the electrode assembly 30 (the first side 112) to the side facing the electrode assembly 30 (the second side 113), which is shown as gradually increasing from top to bottom or from outside to inside in the figures. For example, the cross-section of the first through holes 14 may be of a trapezoidal structure. However, those skilled in the art can conceive of other similar structures that are narrower at the top and wider at the bottom. By means of this design, the particles on the narrow aperture side can be effectively prevented from entering the electrode assembly 30 while the smooth flow of the electrolyte is facilitated. It should be understood that the structure of the first through holes 14 is not limited thereto, and may be other similar structures, which will not be listed one by one here.

In some embodiments, as shown in FIG. 7, the current collector (i.e., the negative electrode current collector 10) further includes an extension member 12 that is disposed at the circumferential edge on the first side 112 and protrudes in a direction away from the second side 113. As shown in FIG. 7, the extension member 12 is disposed at the outer circumferential edge of the current collector body 11. When the current collector is mounted, the extension member 12 is welded to the inner side of the housing 20. According to some embodiments, the extension member 12 is configured as a flange extending from the outer circumferential edge of the current collector body 11 along a direction substantially perpendicular to the current collector body 11. Optionally, the flange is continuous in the circumferential direction, eliminating notches in the circumferential direction. In this way, no gaps or notches that allow laser light to pass through exist between the current collector and the housing 20 during the welding, thereby avoiding the problem of laser light leakage when the current collector 10 is laser-welded to the housing 20. In the case of laser light leakage, laser light may enter the electrode assembly 30 through the gap or notch, thereby damaging the electrode assembly 30 and affecting the yield.

According to some embodiments of the present application, the extension member 12 and the current collector body 11 are of an integrated structure. For example, the extension member 12 may be configured as a flange bent from the outer circumferential edge of the current collector body 11. Optionally, the joint between the extension member 12 and the current collector body 11 is configured with a chamfer structure.

According to some embodiments of the present application, the outer diameter of the extension member 12 is greater than the inner diameter of the housing 20 of the battery cell 102. Optionally, the outer diameter of the extension member 12 is 0.2-0.5 mm greater than the inner diameter of the housing 20 of battery cell 102, such that an interference connection exists between the current collector and the housing 20. In the case that the extension member 12 is continuously distributed along the circumferential edge, a so-called "seamless connection" is achieved between the current collector and the housing 20, which not only benefits the sealing performance of the battery cell 102, but also prevents the problem of laser leakage during laser welding.

Optionally, in this embodiment, the negative electrode current collector 10 is welded to the housing body 21 through the extension member 12. The housing body 21 is electrically connected to the negative electrode current collector 10, such that after the battery cells 102 are assembled, the housing body 21 can form a negatively charged structure. Since the cover plate 40 is provided with the positive electrode connection terminal electrically connected to the positive electrode current collector 90, the positive electrode connection terminal is positively charged, thereby enabling the normal charging and discharging operations of the battery cells 102. Certainly, in other embodiments of the present application, the positive electrode current collector 90 may be configured as the structure shown in FIG. 7 to FIG. 11, and the negative electrode current collector 10 may be configured as a conventional disk-like structure that does not protrude from the housing 20. Moreover, the positive electrode current collector 90 and the housing body 21 are positively charged, and the negative electrode connection terminal is disposed on the cover plate 40, such that the negative electrode connection terminal is negatively charged after being electrically connected to the negative electrode current collector 10. This is not limited in this embodiment.

According to the embodiment shown in FIG. 7 to FIG. 8, third through holes 13 are formed around the blocking structure 18 on the current collector body 11. The third through holes 13 are configured to allow the liquid to flow through, and the third through holes 13 are configured to prevent the solid particles from passing through. The plurality of third through holes 13 are divided into a plurality of groups of hole-like structures, with each group of hole-shaped structures including a plurality of third through holes 13. The plurality of groups of hole-like structures are spaced apart from each other around the circumference of the blocking structure 18. The plurality of third through holes 13 in each group are arranged in a fan-shaped array, a circular array, or a square array. A fan-shaped array is shown in the figures. It should be understood that the shapes of the hole-like structures are not limited thereto.

The third through holes 13 may be uniformly distributed or non-uniformly distributed, and the apertures of the third through holes may be set to be the same or different. It is important that the apertures of all the third through holes 13 on the outer side, i.e., the side distal to the electrode assembly 30, must be small enough so that the metal particles produced during the welding cannot pass through, thereby effectively preventing the particles produced during the welding from entering the electrode assembly 30 while ensuring the flow of the electrolyte. In some embodiments, the apertures of the third through holes 13 on the side of the blocking structure 18 facing away from the second side 113 are 100-500 µm, optionally 100-200 µm. By limiting the apertures to 500 µm or less, the metal particles produced during the welding can be prevented from passing through the third through holes 13. In addition, by setting the apertures of the third through holes 13 to 100 µm or more, the electrolyte can be ensured to smoothly flow through without forming local blockages. In addition, by setting the apertures to 200 µm or less, the metal particles produced during the welding can be prevented from passing through the third through holes 13, thereby improving the reliability of the electrode assembly 30 and the battery cells 102. The size of this "aperture" can be measured using a conventional measuring tool, e.g., a vernier caliper.

According to some embodiments of the present application, referring to FIG. 9, the apertures of the third through holes 13 are of a structure that is narrower at the top and wider at the bottom, that is, the cross-sectional areas or inner diameters of the apertures gradually increase from the side facing away from the electrode assembly 30 (the first side 112) to the side facing the electrode assembly 30 (the second side 113), which is shown as gradually increasing from top to bottom or from outside to inside in the figures. For example, the cross-section of the third through holes 13 may be of a trapezoidal structure. However, those skilled in the art can conceive of other similar structures that are narrower at the top and wider at the bottom. By means of this design, the particles on the narrow aperture side can be effectively prevented from entering the electrode assembly 30 while the smooth flow of the electrolyte is facilitated. It should be understood that the structure of the third through holes 13 is not limited thereto, and may be other similar structures, which will not be listed one by one here.

According to some embodiments of the present application, the battery cell 102 further includes an explosion-proof valve (not shown). The explosion-proof valve may be disposed, for example, on the cover plate 40; in other embodiments, the explosion-proof valve may be disposed on the housing body 21, which is not limited herein. When safety problems such as overheating occur inside the electrode assembly 30 and pressure relief through valve venting is required, the blocking structure 18 provided according to the present application can facilitate the discharge of gas inside the electrode assembly 30 through the first through holes 14 and the third through holes 13, and enable the pressure relief through the explosion-proof valve, thereby preventing the pressure from being concentrated at the current collector and failing to be transferred to the explosion-proof valve, avoiding delayed valve venting, and further reducing safety risks.

According to some embodiments of the present application, the plurality of groups of hole-like structures of the third through holes 13 are spaced apart from each other by gap parts in the radial direction of the current collector body 11. In the embodiments shown in the figures, these hole-like structures are distributed in a fan-shaped pattern around the blocking structure 18. By reserving some gaps without through holes between the hole-like structures, the contact area between the current collector and the positive electrode connection terminal or the negative electrode connection terminal of the electrode assembly 30 can be ensured, thereby improving the current passage capacity and achieving excellent conductive performance. Optionally, the sum of the areas of the third through holes 13 on the first side 112 of the current collector body 11 is 10%-30% of the surface area of the first side 112 of the current collector body 11.

Thus, not only is a sufficient contact area reserved on the current collector body 11, but also the flow efficiency of the electrolyte can be ensured.

Figure 10:
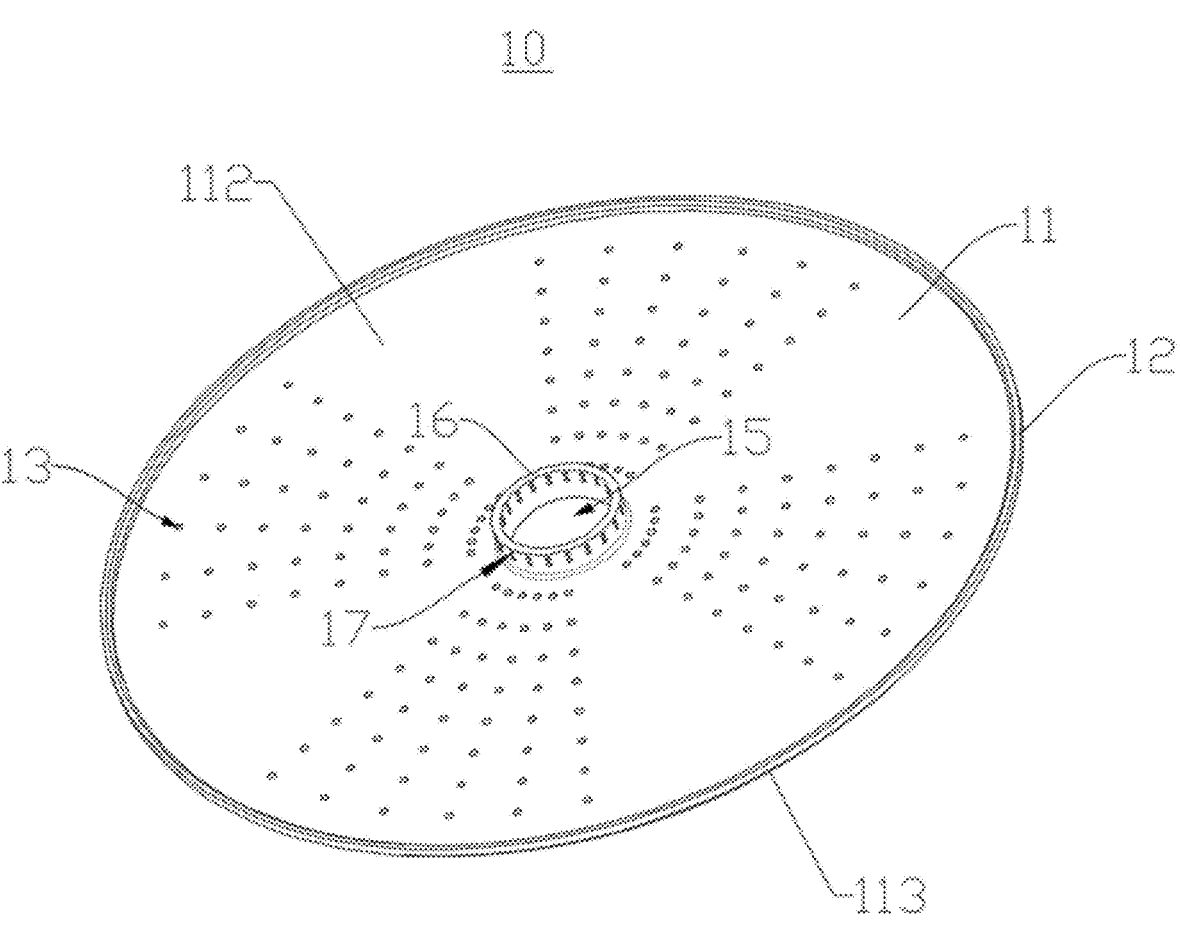
FIG. 10 is a perspective view of a current collector according to some embodiments of the present application.
Figure 11:
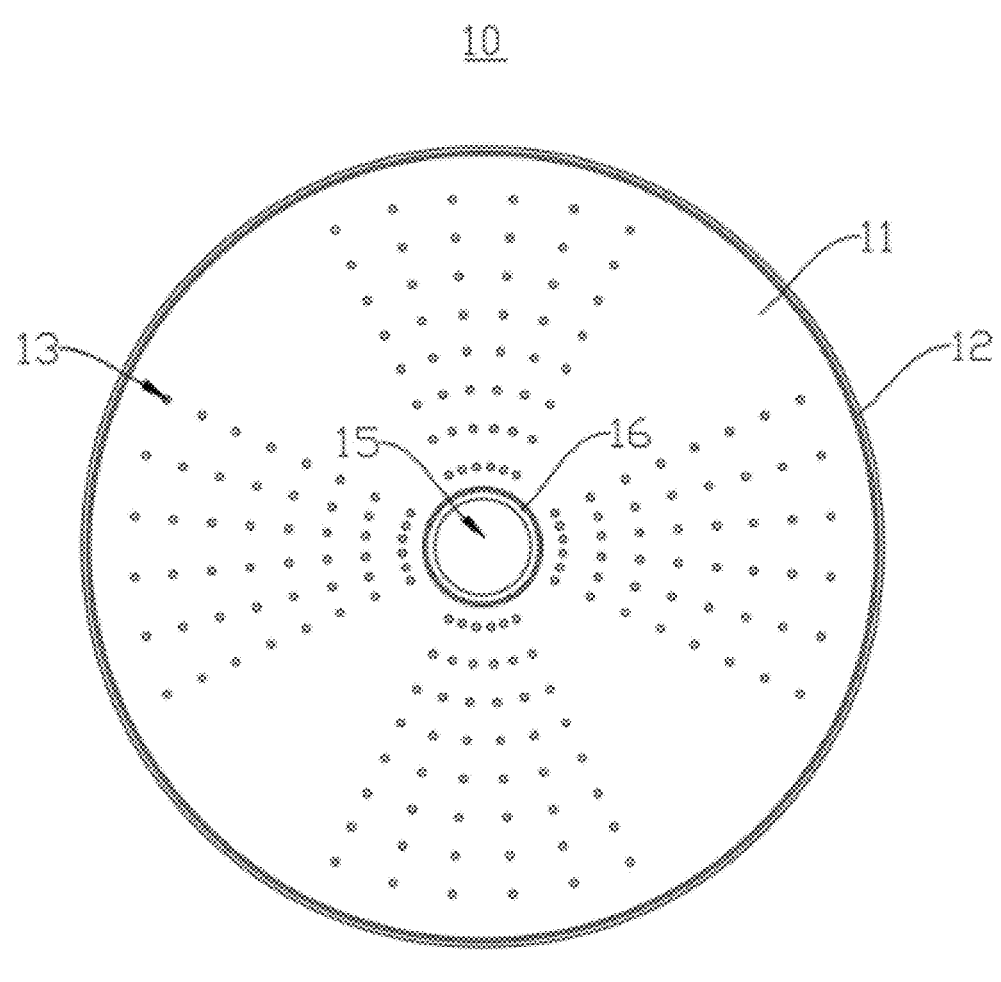
FIG. 11 is a top view of FIG. 10.

FIG. 10 is a perspective view of a current collector according to a second embodiment of the present application. FIG. 11 is a top view of FIG. 10.

Referring to FIG. 10 to FIG. 11, in this embodiment, the current collector also includes a current collector body 11 and an extension member 12. Here, structural features identical to those of the current collector structure of the first embodiment described above will not be repeated. The difference lies in that: in this embodiment, the blocking structure 18 is a tubular structure 16 and is disposed around the circumference of the opening 15, and one end of the blocking structure 18 is connected to the first side 112 and the other end extends in a direction away from the second side 113. As can be seen from FIG. 10, the tubular structure 16 extends outwards (i.e., the side distal to the electrode assembly 30) around the circumferential edge of the opening 15 in the direction substantially perpendicular to the current collector body 11. Optionally, the tubular structure 16 and the current collector body 11 are formed as an integrally formed structure. Here, the side wall of the tubular structure 16 can prevent metal particles produced during the welding from entering the electrode assembly 30. In this embodiment, after the current collector is welded, the top of the tubular structure 16 is in contact with the cover plate 40 to play a certain supporting role, thereby reducing the risk of collapse of the cover plate 40 during subsequent liquid injection.

In some embodiments, the tubular structure 16 is configured as a blocking ring disposed around the circumference of the opening 15. In optional embodiments, as shown in FIG. 10, the side wall of the tubular structure 16 is provided with a plurality of second through holes 17, and the second through holes 17 can cooperate with the side wall of the tubular structure itself to prevent metal particles produced during the welding from passing through while allowing the electrolyte to pass through. It should be understood that the second through holes 17 are not necessary, and in other embodiments, the side wall of the tubular structure 16 may not be provided with the second through holes 17.

In some embodiments, the apertures of the second through holes 17 on the side of the blocking structure 18 facing away from the opening 15 are 100-500 µm; optionally, the apertures of the second through holes 17 on the side of the blocking structure 18 facing away from the opening 15 are 100-200 µm. By limiting the apertures to 500 µm or less, the metal particles produced during the welding can be prevented from passing through the second through holes 17. In addition, by setting the apertures of the second through holes 17 to 100 µm or more, the electrolyte can be ensured to smoothly flow through without forming local blockages. In addition, by setting the apertures to 200 µm or less, the metal particles produced during the welding can be prevented from passing through the second through holes 17, thereby improving the reliability of the electrode assembly 30 and the battery cell 102.

In some embodiments, the cross-sectional areas of the second through holes 17 gradually increase in a direction close to the opening 15 (i.e., from a direction away from the opening 15 to a direction close to the opening 15). Thus, not only can the metal particles be prevented from passing through the second through holes 17, but also the smooth flow of electrolyte can be ensured, thereby ensuring the wettability of the electrode assembly 30, such that the reliability of the electrode assembly 30 and the battery cell 102 can be ensured.

In some other embodiments, the tubular structure 16 includes a plurality of blocking columns (not shown in the figures). The plurality of blocking columns are spaced apart from each other around the circumference of the opening 15, and gaps formed between these blocking columns can allow the electrolyte to pass through, but cannot allow the solid particles to pass through.

In the above embodiments, the current collector and the battery cell 102 according to the present application are described by taking the cylindrical battery as an example. The structures of the current collector and the battery cells are briefly described here. In the case of the cylindrical battery, the electrode assembly 30 is formed by winding a positive electrode plate, a separator, and a negative electrode plate that are arranged in a stacked manner. After the winding is completed, a central channel formed at a starting winding section of the positive electrode plate, the separator, and the negative electrode plate is the liquid injection channel 31 of the battery cell 102 (see, for example, FIG. 4). As can be seen from FIG. 6, in the first embodiment of the present application, the position of the blocking structure 18 corresponds to the position of the liquid injection channel 31 inside the battery cell 102. Thus, the electrolyte in the liquid injection channel 31 can smoothly flow to the end position inside the housing 20 via a plurality of liquid transfer holes of the blocking structure 18. Here, the current collector body 11 is configured as a circular sheet-like member, and the projection of the outer boundary of the blocking structure 18 on the current collector body 11 is a central circle concentric with the current collector body 11. Optionally, the blocking structure 18 is formed integrally with the current collector body 11. In other words, the blocking structure 18 itself is formed as a part of the current collector body 11, and the current collector body 11 is provided with a plurality of first through holes 14 at positions corresponding to the liquid injection channel 31. In the second embodiment of the present application, the tubular structure 16 is configured as a tubular structure of a cylindrical battery, and the cylindrical structure is the blocking ring described above. Certainly, it will be understood by those skilled in the art that the technical solutions of the present application are also applicable to battery structures other than cylindrical batteries, such as a square battery. The current collector body 11 of the current collector may also be configured in other shapes to adapt to different types of battery cells, and the specific shape of the blocking structure 18 is not limited to the shape of a circular sheet or cylinder.

According to some embodiments of the present application, the present application further provides a battery, including the battery cell 102 according to any one of the above solutions. One or a plurality of battery cells 102 may be provided. If a plurality of battery cells 102 are provided, the plurality of battery cells 102 may be connected in series, in parallel, or in series-parallel. The series-parallel connection means that both series connection and parallel connection are present in the connection of the plurality of battery cells 102. The plurality of battery cells 102 may be directly connected in series, in parallel, or in series-parallel, and then the whole formed by the plurality of battery cells 102 is accommodated in the case. Certainly, alternatively, the plurality of battery cells 102 may be first connected in series, in parallel, or in series-parallel to form battery modules, and then the plurality of battery modules are connected in series, in parallel, or in series-parallel to form a whole and accommodated in the case.

According to some embodiments of the present application, the present application further provides an electric device (illustratively, a vehicle 01), including the battery according to any one of the above solutions. The battery is configured to provide electric energy for the electric device.

Finally, it should be noted that the above embodiments are only used to illustrate the technical solutions of the present application, rather than limit same. Although the present application has been described in detail with reference to the foregoing embodiments, it should be understood by those of ordinary skill in the art that modifications can still be made to the technical solutions recorded in the foregoing embodiments, or equivalent substitutions to some or all of the technical features can be made. However, such modifications or substitutions do not make the spirit of the corresponding technical solutions deviate from the scope of the technical solutions in the embodiments of the present application, and shall all fall within the scope of claims and description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A current collector, comprising:

a current collector body having a first side and a second side disposed opposite to each other, wherein an opening penetrating the first side and the second side is formed on the current collector body; and a blocking structure, which is conductive, disposed at the opening and configured to prevent solid particles from passing through the opening from the first side to move to the second side and allow liquid to flow through the opening, wherein a plurality of third through holes are formed at positions around a circumference of the blocking structure on the current collector body, the plurality of third through holes are configured to allow the liquid to pass through and prevent the solid particles from passing through.

2. The current collector according to claim 1, wherein the blocking structure is configured as a mesh structure and blocks the opening.

3. The current collector according to claim 2, wherein the blocking structure comprises a blocking plate, a plurality of first through holes in communication with the opening are formed on the blocking plate, and the plurality of first through holes are spaced apart from each other, such that the blocking plate is configured as a mesh structure; or the blocking structure comprises a plurality of blocking strips arranged in a staggered manner, and the plurality of blocking strips form a plurality of first through holes in communication with the opening;

the first through holes are configured to allow liquid to flow through and can prevent the solid particles from passing through.

4. The current collector according to claim 3, wherein apertures of the first through holes on a side of the blocking structure facing away from the second side are 100-500 μm.

5. The current collector according to claim 3, wherein cross-sectional areas of the first through holes gradually increase from the first side to the second side.

6. The current collector according to claim 1, wherein the blocking structure is a tubular structure and is disposed around a circumference of the opening, and one end of the blocking structure is connected to the first side and the other end extends in a direction away from the second side.

7. The current collector according to claim 6, wherein the blocking structure comprises a blocking ring, and the blocking ring is disposed around the circumference of the opening; or the blocking structure comprises a plurality of blocking columns, and the plurality of blocking columns are spaced apart from each other around the circumference of the opening.

8. The current collector according to claim 6, wherein second through holes in communication with the opening are formed on the blocking structure, the second through holes are configured to allow liquid to flow through, and the second through holes can prevent the solid particles from passing through.

9. The current collector according to claim 8, wherein apertures of the second through holes on a side of the blocking structure facing away from the opening are 100-500 μm.

10. The current collector according to claim 8, wherein cross-sectional areas of the second through holes gradually increase in a direction close to the opening.

11. The current collector according to claim 1, wherein the current collector body are divided into a plurality of fan-shaped arrays around the circumference of the blocking structure, the plurality of third through holes are distributed into some of the fan-shaped arrays to form holes-containing arrays, which are spaced apart from each other by blank arrays containing no third through holes around the circumference of the blocking structure.

12. The current collector according to claim 11, wherein each of the holes-containing arrays extends from a position close to the blocking structure to an edge of the current collector body.

13. The current collector according to claim 11, wherein apertures of the third through holes on a side of the blocking structure facing away from the second side are 100-500 μm.

14. The current collector according to claim 1, wherein cross-sectional areas of the third through holes gradually increase from the first side to the second side.

15. The current collector according to claim 1, wherein the current collector further comprises an extension member, and the extension member is disposed at a circumferential edge on the first side and protrudes in a direction away from the second side.

16. A battery cell, comprising a housing, an electrode assembly, a positive electrode current collector, and a negative electrode current collector, wherein the housing is provided with a positive electrode connection terminal and a negative electrode connection terminal; the electrode assembly is disposed in the housing; a positive electrode output end of the electrode assembly is electrically connected to the positive electrode connection terminal through the positive electrode current collector; a negative electrode output end of the electrode assembly is electrically connected to the negative electrode connection terminal through the negative electrode current collector; at least one of the positive electrode current collector and the negative electrode current collector is the current collector according to claim 1.

17. The battery cell according to claim 16, wherein the housing comprises a housing body and a cover plate; the housing body is provided with an accommodating space with one end provided with an opening; the cover plate lids the opening and closes the opening; the negative electrode connection terminal is disposed on the cover plate, and the positive electrode connection terminal is disposed at a position of the housing body opposite to the cover plate; the electrode assembly is disposed in the accommodating space, and the positive electrode output end and the negative electrode output end are located at both ends of the electrode assembly to be connected to the positive electrode connection terminal and the negative electrode connection terminal, respectively.

18. The battery cell according to claim 17, wherein the positive electrode current collector comprises:

a current collector body having a first side and a second side disposed opposite to each other, wherein an opening penetrating the first side and the second side is formed on the current collector body; and a blocking structure disposed at the opening and configured to prevent solid particles from passing through the opening from the first side to move to the second side, wherein the blocking structure is configured as a mesh structure and blocks the opening.

19. The battery cell according to claim 17, wherein the negative electrode current collector comprises:

a current collector body having a first side and a second side disposed opposite to each other, wherein an opening penetrating the first side and the second side is formed on the current collector body; and a blocking structure disposed at the opening and configured to prevent solid particles from passing through the opening from the first side to move to the second side, wherein the blocking structure is a tubular structure and is disposed around a circumference of the opening, and one end of the blocking structure is connected to the first side and the other end extends in a direction away from the second side; a top of the tubular structure is in contact with the cover plate and supports the cover plate.

20. The battery cell according to claim 16, wherein the electrode assembly is provided with a liquid injection channel, and the opening is opposite to and in communication with the liquid injection channel.

21. The battery cell according to claim 20, wherein a size of the opening is matched with a size of the liquid injection channel.

22. The battery cell according to claim 20, wherein the electrode assembly is formed by winding a positive electrode plate, a separator, and a negative electrode plate that are arranged in a stacked manner, and the liquid injection channel is a central channel formed by a starting winding section of the positive electrode plate, the separator, and the negative electrode plate.

23. The battery cell according to claim 17, wherein the positive electrode current collector or the negative electrode current collector comprises an extension member, the extension member is disposed at a circumferential edge of the first side and protrudes in a direction away from the second side, an outer diameter of the extension member is greater than an inner diameter of the housing of the battery cell, and the extension member is connected to the housing.

24. The battery cell according to claim 23, wherein the positive electrode connection terminal is disposed on the housing body, and the negative electrode connection terminal is disposed on the cover plate; the electrode assembly is disposed in the accommodating space, and the positive electrode output end and the negative electrode output end are located at both ends of the electrode assembly to be connected to the positive electrode connection terminal through the positive electrode current collector and to the negative electrode connection terminal through the negative electrode current collector, respectively; the negative electrode current collector comprises the extension member, and the extension member is electrically connected to the housing body.

25. The battery cell according to claim 24, wherein a liquid injection hole is formed on the positive electrode connection terminal, the liquid injection hole is sealed with a rubber plug, and the liquid injection hole is opposite to and in communication with the opening;

or a liquid injection hole is formed on the negative electrode connection terminal, the liquid injection hole is sealed with a rubber plug, and the liquid injection hole is opposite to and in communication with the opening.

26. A battery, comprising at least one of the battery cells according to claim 16.

* * * * *